Nov. 22, 1927.                                                1,650,063
              N. A. CHRISTENSEN
              CONTROL VALVE MECHANISM
              Filed Sept. 17, 1926
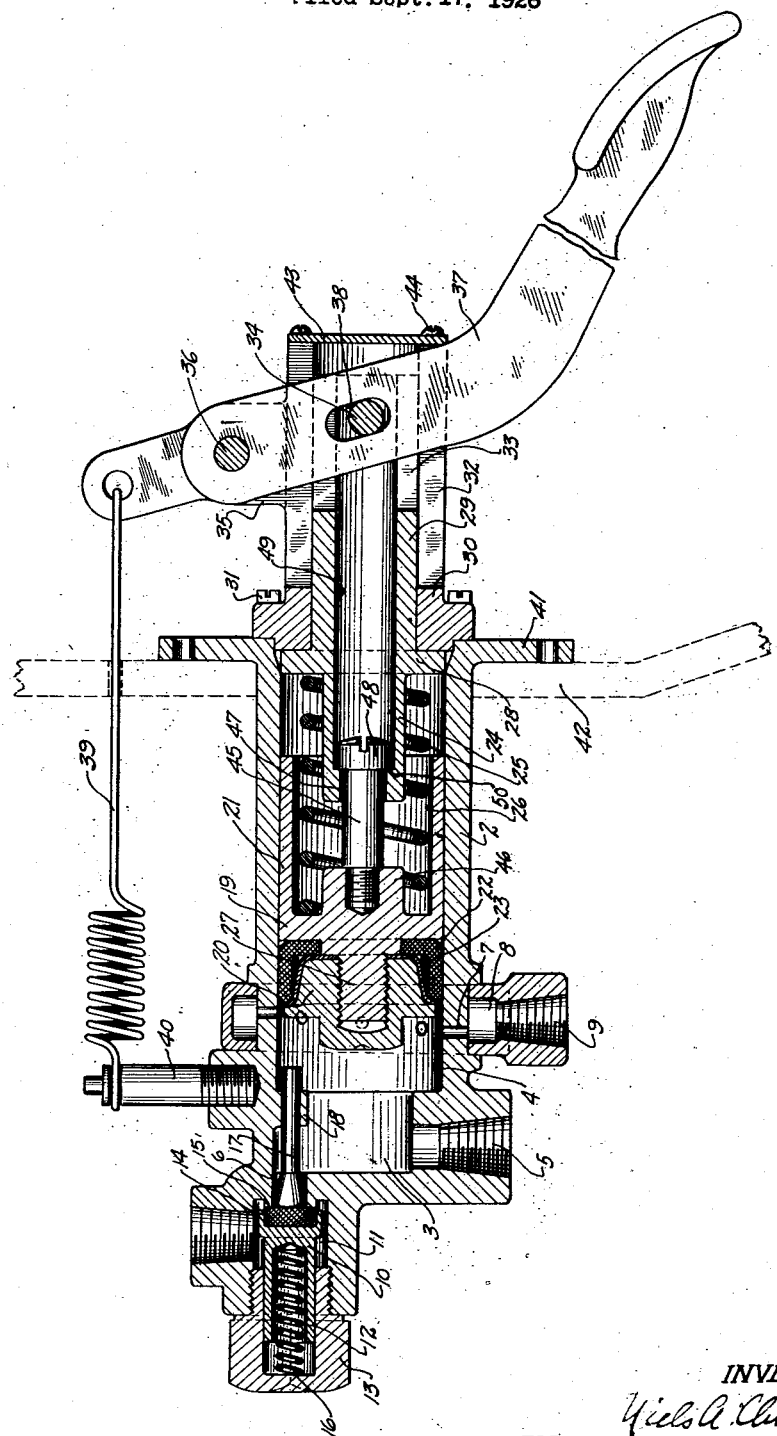
                                              INVENTOR
                                       BY
                                              ATTORNEYS Patented Nov. 22, 1927.

1,650,063

UNITED STATES PATENT OFFICE.

NIELS A. CHRISTENSEN, OF CLEVELAND, OHIO.

CONTROL-VALVE MECHANISM.

Application filed September 17, 1926. Serial No. 136,159.

The invention relates to brake control valves, and more particularly adapted for use in connection with the fluid-pressure-operated brakes of automotive vehicles and trailers for such vehicles.

One object of the invention is to provide an improved control valve mechanism of the type shown in my prior application, Serial No. 23,847, filed April 17, 1925, and to simplify such construction by making the compensating piston itself perform the function of controlling the exhaust from the casing.

The invention further consists in the several features hereinafter set forth and more particularly defined by claims at the conclusion hereof.

The drawing shows a cross-sectional view through control valve mechanism embodying the invention.

In the drawing the numeral 2 designates a valve casing having a space 3 formed therein including a bore 4. A brake passage 5 and a valve-controlled inlet passage 6 communicate with the space 3. A plurality of relief or exhaust passages 7 lead from the casing to an annular space 8 and thence through an opening 9 to atmosphere.

An inlet valve 10 controls the flow of compressed air or other pressure fluid from the chamber 11 connected by piping, not shown, with a suitable source of compressed air supply on the vehicle. The passage 5 is connected by any suitable piping to the brake cylinders, not shown, associated with the wheels of the vehicle.

The inlet valve 10 has a tubular portion 12 slidably mounted in the bore of a boxnut 13 having threaded engagement with the casing, and has a head 14 of composition material inset therein and held against the seat 15 by a spring 16 mounted in the bore of the portion 12 and interposed between the end of said bore and the outer end of the bore in the nut 13.

A push-pin 17 has its conical head working in the passage or port 6 and its stem guided in the lug 18 projecting into the space 3 of the casing. The head of this pin engages the head 14 of the inlet valve and due to its conical shape will gradually increase the effective port opening as it is pushed in toward the valve by the application of the operating means.

The piston 19, formed of parts 20 and 21 and the flexible packing members 22 and 23, works in the bore 4 and is moved in one direction by pressure transmitted to it from a plunger 24 by a spring 25, and in the opposite direction by fluid-pressure acting against its inner end. The part 21 has a bore 26 in which the spring 25 seats and a threaded tubular end 27 which is in threaded engagement with the portion 20 of the piston. These members 20 and 21 clamp between them the annular flexible packing 22 and the flexible metal disk 23 adapted to press the outer edge of the flexible packing 22 into sealing engagement with the bore of the casing.

The plunger 24 has a spring seating flange 28 working in a cylindrical portion 29 guided in a tubular extension 30 secured to the casing 2 by screws 31, said extension having vertically disposed slots 32 therein. The end of the portion 29 of the plunger has a slot 33 formed therein and carries a pin 34. Spaced lugs 35 are also provided on said extension and have a fulcrum pin 36 mounted therein. A foot-pedal or lever 37 is pivoted on the pin 36, works in the slots 32 and 33, and has a slot 38 through which the pin 34 passes. This lever, by means of a spring 39 secured to it and to a stud 40 mounted on the casing, is moved with the plunger 24 associated with it through the pin-and-slot connection above described to its outer position in which the spring 25 is relieved or substantially relieved of its tension. When, however, the operator presses down on the lever 37 the plunger 24 is moved inwardly, putting a tension on the spring 25 which thereupon transmits its force to the piston 19, causing it to move inwardly.

The casing 2 is provided with a flange 41 for convenient mounting on the dash 42 of the vehicle, and the extension 30 has a cover plate 43 secured to it by screws 44.

From the drawing it will be noted that the exhaust ports 7 have their centers located in a plane inclined at an angle to the axis of the bore 4 so that the movement of the piston acts to successively open or close these ports, thereby providing for a gradual release of air from the casing and hence from the brake system associated therewith, the piston acting as a valve to control the passage of air from these ports.

As shown in the drawing, the ports are in a nonapplication position, and it will be noted that under these conditions the piston 19 is moved to a position to uncover all the exhaust ports 7. To make a brake application the operator presses down on the foot-pedal 37 and moves the plunger 24 inwardly which, through the spring 25, causes an inward movement of the piston 19, and upon its inward movement its packing acts to close off the relief ports 7 and to keep said relief ports closed for the travel of the piston to a "lap" position and thereafter to a position in which the end 20 of the piston engages the pin 17 and moves the same to open the inlet valve 10 to admit compressed air to the brake system. As soon as the pressure of air in the brake system builds up to a sufficient extent to counteract the tension induced in the spring 25 by the operator's action on the foot-pedal, the piston 19 will move away from the inlet valve to a "lap" position wherein the inlet valve is closed and the exhaust ports 7 are still covered by the piston, since the piston travel is then not sufficient to uncover the exhaust port or ports 7. Thereafter release of the pressure on the spring 25 by the release of pressure on the foot-pedal will cause the piston 19 to travel, due to the pressure exerted upon it by the compressed fluid in the space 3, and hence it will move to such an extent as to uncover the ports 7 and cause the release of air from the brake system. But, if further pressure is desired when the piston is in a "lap" position, a further increase of pressure upon the spring 25 by the greater movement of the pedal 37 will cause the piston 19 to move from the "lap" position heretofore noted to again engage the pin 17 and cause the inlet valve 10 to be again opened to admit more air from the supply to the brake system while the ports 7 are still closed off by the piston.

Thus, the more the operator presses down on the foot-pedal 37 the greater is the force stored up in the spring 25 and the greater the air pressure in the space 3 has to be to overcome this force to bring the piston to a "lap" position so that the extent of braking pressure in the system is dependent upon the degree of movement of the lever 37, which is under the control of the operator, to again thus regulate and control the amount of braking pressure he desires. As the spring 39 acts to return the lever 37 and plunger 24 to a release position when the operator releases the pressure therefrom the pressure upon the spring 25 is released at a time when the piston 19 has been moved to such a position that the ports 7 are open.

To positively insure the movement of the piston 19 to a position in which the piston has uncovered the ports, I have provided a connection between said piston and the operating member or plunger 28, consisting of a screw 45 having threaded engagement with the boss 46 on the part 21 and slidably mounted in a reduced bore 47 in the plunger 32 with its head 48 sliding in a bore 49 in said plunger and adapted to abut against a shoulder 50 formed by the bores 47 and 49 when the plunger 32 is moved outwardly by the spring 39 so that near the end of the movement of said plunger the piston 19 moves therewith.

It will be noted that the screw 45 does not interfere with the movement of the piston 19 relative to the plunger 32 when the spring 25 is compressed.

It will be further noted that when the piston 19 is moved outwardly by the action of the compressed air in the space 3 it will, because of the disposition of the exhaust port 7, provide for a gradual release of braking pressure from the system as the ports are not all uncovered at the same time but are successively uncovered.

While the pin 17 is shown as separate from the valve it may, of course, be formed integral therewith.

I desire it to be understood that this invention is not to be limited to any particular form or arrangement of parts except in so far as such limitations are specified in the claims.

What I claim as my invention is:

1. In a vehicle brake control valve, the combination of a casing communicating with the brake system and having inlet and exhaust ports, a poppet inlet valve controlling the passage of motive fluid through said inlet port to said casing and brake system, a piston working in said casing for opening said inlet valve and responsive to the pressure in said casing to open said inlet valve or to permit its closing when the piston moves to a "lap" position, said piston also having its packing forming a valve to control the passage of air from said exhaust port to release the air from the brake system, and means under the control of the operator to exert variable pressures on said piston to oppose the pressure in said casing whereby to control the position and movement of said piston relative to said inlet valve and said exhaust port.

2. In a vehicle brake control valve, the combination of a casing communicating with the brake system and having an inlet and a plurality of exhaust ports, an inlet valve controlling the passage of motive fluid through said inlet port to said casing and brake system, a piston working in said casing for opening said inlet valve and responsive to the pressure in said casing to open said inlet valve or to permit its closing when the piston moves to a "lap" position, said exhaust ports being offset relative to each other and controlled by the piston overrunning said ports and adapted to gradually increase the exhaust port area as the piston moves to a brake-release position, and means under the control of the operator to exert variable pressures on said piston to oppose the pressure in said casing whereby to control the position and movement of said piston relative to said inlet valve and said exhaust ports.

3. In a vehicle brake control valve, the combination of a casing communicating with the brake system and having inlet and exhaust ports, a poppet inlet valve controlling the passage of motive fluid through said inlet port to said casing and brake system, a piston working in said casing and movable to open said inlet valve and forming a valve directly controlling the exhaust through said exhaust port, a plunger under the control of the operator, a spring interposed between said plunger and piston whereby said piston may shift in said casing relative to said plunger under the pressure in said casing to a "lap" position.

4. In a vehicle brake control valve, the combination of a casing communicating with the brake system and having inlet and exhaust ports, a poppet inlet valve controlling the passage of motive fluid through said inlet port to said casing and brake system, a piston working in said casing and movable to open said inlet valve and forming a valve directly controlling the exhaust through said exhaust port, a plunger under the control of the operator, a spring interposed between said plunger and piston whereby said piston may shift in said casing relative to said plunger under the pressure in said casing to a "lap" position, means for moving said plunger to a release position, and a connection between said plunger and piston for positively moving said piston to its release position.

In testimony whereof, I affix my signature.

NIELS A. CHRISTENSEN.